United States Patent [19]

Goguet

[11] 4,280,340
[45] Jul. 28, 1981

[54] UNIVERSAL JOINT, NOTABLY FOR AUTOMOBILE VEHICLE TRANSMISSIONS

[75] Inventor: Jean A. Goguet, Limours, France

[73] Assignees: Societe Anonyme Automobiles Citroen; Automobiles Peugeot, both of France

[21] Appl. No.: 76,219

[22] Filed: Sep. 17, 1979

[30] Foreign Application Priority Data

Oct. 27, 1978 [FR] France ............................. 78 30553

[51] Int. Cl.³ ............................................. F16D 3/30
[52] U.S. Cl. ...................................... 64/21; 64/32 R; 64/8
[58] Field of Search ...................... 64/21, 8, 32 R, 3; 277/212 FB

[56] References Cited

U.S. PATENT DOCUMENTS

| | | | |
|---|---|---|---|
| 3,318,108 | 5/1967 | Cadiou | 64/8 |
| 3,792,596 | 2/1974 | Orain | 64/21 |
| 3,817,057 | 6/1974 | Orain | 64/21 |
| 3,906,747 | 9/1975 | Orain | 64/21 |
| 4,175,407 | 11/1979 | Orain | 64/21 |

FOREIGN PATENT DOCUMENTS 1268917 6/1961 France ............................. 64/8

Primary Examiner—Ira S. Lazarus
Assistant Examiner—Magdalen Moy
Attorney, Agent, or Firm—Stevens, Davis, Miller & Mosher

[57] ABSTRACT

The universal joint according to the invention comprises a drive element provided with at least two ball-races cooperating with rollers borne by a hub fast to a driven shaft, the outer surface of the drive element being substantially parallel with the inner surface of this element and including concave areas. It includes an insert having an inner surface which mates the outer surface of the drive element, while the outer surface of this insert has a convex contour to serve as a support for a sealing sheath, the insert ensuring filling of the concave areas. This insert is notably of plastics material over-molded on the drive element.

10 Claims, 3 Drawing Figures

UNIVERSAL JOINT, NOTABLY FOR AUTOMOBILE VEHICLE TRANSMISSIONS

BACKGROUND OF THE INVENTION

1. Field of the Invention

The present invention relates to universal joints, notably for automobile vehicle transmissions. It relates particularly to the type of universal joint which comprises a drive element, coupled to a drive shaft, substantially bowl-shaped, and provided with at least two ball-races cooperating with rollers borne by a hub fast to a driven shaft, the outer surface of the drive element being substantially parallel with the inner surface of this element so that its outer surface includes concave areas situated, angularly, between the ball-races, a sealing sheath being arranged around the bowl and the driven shaft.

2. Description of the Prior Art

In such universal joints, the fixing of the sealing sheath on the end of the drive element poses problems. In fact, this sealing sheath covers the outer surface of the end of the drive element. Now, the presence of concave areas in this outer surface constitutes an impediment to the realization of the good fluid-tightness by the clamping of the sealing sheath around the drive element.

Various solutions to this problem have already been proposed. These solutions require, however, improvement, notably from the point of view of simplicity of construction and reduction of cost price, as well as from the point of view of fluid-tightness achieved between the drive element and the sheath.

It is a particular object of the invention to render universal joints of the type concerned such that they respond to the various requirements of practice better than hitherto and notably such that the above-mentioned drawbacks are eliminated or at least reduced.

GENERAL DESCRIPTION OF THE INVENTION

According to the invention, a universal joint, of the previously defined type, is characterized by the fact that it comprises an insert around the open end of the drive element, this insert having an inner surface which mates the outer surface of said element, whilst the outer surface of this insert has a cross-section whose contour is entirely convex, this outer surface being notably a surface of revolution and more particularly cylindrical, so as to serve as a support for the sealing sheath held by clamping on said insert, which ensures filling of the above-said concave areas of the outer surface of the drive element.

Preferably, this insert is of plastics material, and is over-molded on to said drive element.

The axial arrest of this insert, with respect to the drive element, is advantageously ensured by notches extending circumferentially, in the convex parts of the drive element, situated angularly between the concave areas, these notches cooperating with ribs of the insert.

The outer surface of the insert has, at its end situated at the edge of the drive element, a peripheral bead, notably of semi-circular cross-section, adapted to cooperate with the sealing sheath.

The parts of the insert ensuring the filling of the concave areas of the outer surface of the drive element comprise, preferably, alveoles or cavities.

The invention relates also to a part designed to be inserted on a drive element of a universal joint of the previously defined type, which insert has an inner surface adapted to mate the outer surface of the drive element whilst the outer surface of this insert has a cross-section whose contour is entirely convex, this outer surface being notably a surface of revolution and more particularly cylindrical, so as to serve as a support for the sealing sheath, this part ensuring filling of the concave areas of the outer surface of the drive element.

BRIEF DESCRIPTION OF THE DRAWINGS

The invention consists, apart from the above explained features, certain other features which will be more explicitly considered below with regard to a particular embodiment described with reference to the accompanying drawings, but which is in no way limiting.

DESCRIPTION OF A PREFERRED EMBODIMENT

Figure 1:
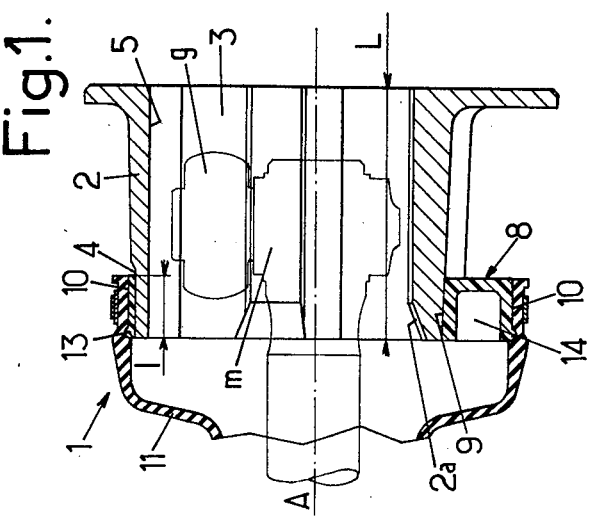
FIG. 1, of these drawings, is an axial section of the drive element and of the insert of a universal joint according to the invention, one of the rollers and the hub fast to the driven shaft being shown diagrammatically.

Referring to the drawings, and more particularly to FIG. 1, there can be seen a universal joint 1 of the tripod type for an automobile vehicle transmission. This joint comprises a drive element 2, coupled to a driving shaft (not shown). This element 2 is substantially bowl-shaped and is provided, in the case of a tripod joint, with three rectilinear ball-races 3, parallel to the axis of the bowl 2 and spaced regularly by 120°, as can be clearly seen in FIG. 2.

These ball-races 3 are adapted to cooperate with rollers g, of which one is shown diagrammatically in FIG. 1, borne by a hub m fast to a driven shaft.

The outer surface 4 (FIG. 2) of the drive element 2 is substantially parallel with the inner surface 5 of the element. This outer surface 4 includes, through this fact, concave areas 6 situated, angularly, between the ball-races 3. The areas 7 of the outer surface having the same angular position as the ball-races 3 are convex and form protuberances or projections with respect to the concave areas 6. The drive element is thus formed with a minimum of relatively expensive material.

Figure 2:
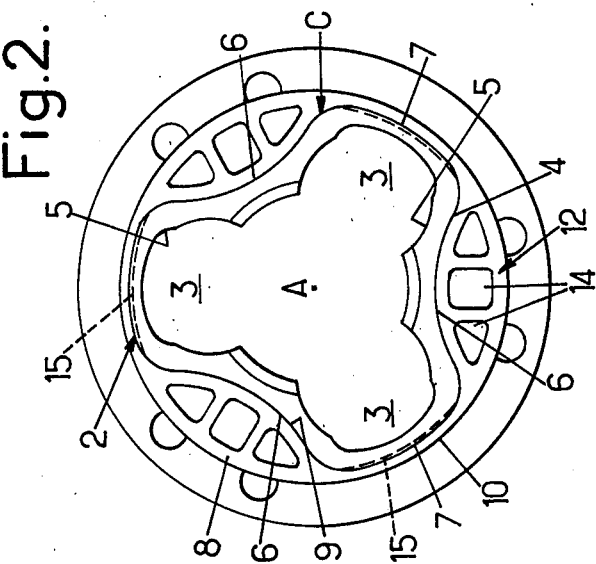
FIG. 2 is a view from the left, with respect to FIG. 1, of the drive element.

It is seen, in FIG. 2, that the outer contour C of the drive element 2 has a shape suggesting that of a star with three arms whose tops have been flattened.

A part 8 is inserted around the open end 2a of the drive element 2. This part 8 has an inner surface 9 which mates the outer surface 4 of the element 2; the outer surface 10 of the insert 8 is a cylindrical surface of revolution and coaxial with the element 2, with axis A.

This cylindrical outer surface 10 serves as a support for sealing sheath 11 which surrounds the open end of the element 2; the other end (not shown) of the sealing sheath 11 is clamped around the driven shaft.

As is clearly seen in FIG. 2, the insert 8 ensures filling of the concave area 6 by parts such as 12, of the insert 8, having greater thickness.

The insert 8 is advantageously formed of plastics material; it only extends, axially, from the open end of the element 2, over a reduced length l with respect to the total length L of the element 2. For example, the ratio L/l is greater than three.

The insert 8 is advantageously over-molded on to the end of the element 2.

Figure 3:
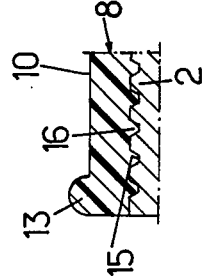
FIG. 3, lastly, is a detail of the embodiment of FIG. 1 shown on a larger scale.

As seen in FIGS. 1 and 3, the outer surface 10 of the part 8 is provided, at its end situated at the level of the open end of the element 2, with a peripheral bead 13 of semi-circular cross-section which cooperates with the sheath 11. The latter extends around the surface 10, beyond the beading 13. The sheath 11 can be clamped against the surface 10 by any suitable means, such as a collar or clamp.

Blind alveoles or cavities 14, opening on the side of the sealing sheath 11, can be provided in the thicker parts 12 of the insert 8 to economize in the plastics material and facilitate molding.

The blocking, axially, of the insert 8 relative to the element 2 can be ensured by cooperation of notches 15 (FIG. 3), parallel with one another and oriented circumferentially, provided in the convex area 7 of the element 2, with ribs 16 of the insert 8 formed during over-molding. This system of notches and ribs could be replaced by ribs provided on the convex area 7 and notches formed by over-molding in the insert 8.

By way of example, the insert 8 may be made from polyacetal.

The solution of the invention enables the economic production of the drive element 2 of a universal joint, with a minimum of material whilst ensuring a "rounding out", that is to say a support surface with a convex contour, at the open end of this element to cooperate with the sealing sheath. In this way good fluid-tightness is produced at the level of the end of the sheath clamped on the element 2.

It is clear that the simplest solution consists of providing an outer, and cylindrical, surface of revolution 10, as shown in the drawings.

It suffices however for this outer surface 10 to have a cross-section (in a plane perpendicular to the axis A) whose contour is entirely convex. A slightly elliptical contour could if necessary be suitable. In the case where the outer surface 10 is a surface of revolution, it is not indispensable for it to be cylindrical; it could, for example, be slightly frustoconic.

It should be noted that the term "roller" used in the description and in the claims must be understood in a general sense as denoting any bearing member.

I claim:

1. A universal joint for a transmission, comprising:
    (a) a substantially bowl-shaped drive element coupled to a drive shaft for transferring torque to a driven shaft, said element having an open end, a length L with respect to its axis of rotation, and at least two ball races for receiving rollers borne by a hub connected fast to said driven shaft, said drive element further having an outer surface substantially parallel with its inner surface so that the outer surface of the drive element includes concave areas angularly situated between the ball-races;
    (b) a sealing sheath having an open end circumferentially mounted around the open end of the bowl of said drive element, and
    (c) an insert circumferentially mounted around the open end of the bowl of the drive element for mounting said open end of said sealing sheath around said drive element, said insert having a length of less than L along its axis of rotation, and an inner surface which is complementary to the outer surface of said drive element for filling said concave areas of said outer surface of said drive element, and an outer surface which is entirely convex for sealingly engaging said open end of said sealing sheath.

2. The universal joint of claim 1, wherein the length L of said drive element is three or more times greater than the length of said insert.

3. The universal joint of claim 1 wherein said bowl-shaped drive element further includes a coupling located opposite its open end for transferring substantially all the torque transferred between said drive shaft and said drive element.

4. The universal joint according to claim 1, wherein said outer surface of said insert is a surface of revolution.

5. The universal joint according to claim 1, wherein said outer surface of said insert is cylindrical.

6. The universal joint according to claim 1, wherein said insert is made from plastics material.

7. The universal joint according to claim 1, wherein said insert in over-molded on the drive element.

8. The universal joint according to claim 1 wherein movement of said insert relative to said drive element is arrested by a plurality of complementary notches and ribs extending circumferentially around the inner surface of said insert and said outer surface of the drive element.

9. The universal joint according to claim 8, wherein the outer surface of said insert has, at its end situated around the open end of said drive element, a peripheral bead of semi-circular cross-section which is complementary to an annular groove situated around the interior of the edge of the open end of said sealing sheath.

10. The universal joint according to claim 1, wherein the parts of the insert filling said concave areas of the outer surface of the drive element include cavities.

* * * * *